United States Patent [19]

Oberdorfer-Bögel

[11] Patent Number: 5,394,041
[45] Date of Patent: Feb. 28, 1995

[54] ELECTRONICALLY COMMUTATED MOTOR FOR DUST EXHAUSTERS, VACUUM CLEANERS AND SIMILAR DEVICES

[75] Inventor: Rainer Oberdorfer-Bögel, Kirchberg, Germany

[73] Assignee: WAP Reinigungssysteme GmbH & Co., Germany

[21] Appl. No.: 222,504

[22] Filed: Apr. 4, 1994

Related U.S. Application Data

[63] Continuation of Ser. No. 917,732, Jul. 20, 1992, abandoned, which is a continuation of Ser. No. 551,985, Jul. 12, 1990, abandoned.

[30] Foreign Application Priority Data

Jul. 14, 1989 [DE] Germany .............................. 3923267

[51] Int. Cl.⁶ ...................... H02K 5/18; H02K 11/00; H02K 21/12; H02K 9/06
[52] U.S. Cl. ........................................ 310/64; 310/62; 310/68 R; 310/156
[58] Field of Search ....................... 310/52, 62, 63, 64, 310/67 R, 68 R, 156; 318/138, 254; 417/423.2; 15/412, 413

[56] References Cited

U.S. PATENT DOCUMENTS

| | | | |
|---|---|---|---|
| Re. 32,027 | 11/1985 | Hyatt et al. | 15/413 |
| 2,601,517 | 6/1952 | Hammes | 310/156 |
| 2,726,807 | 12/1955 | Lewis | 310/62 |
| 2,822,122 | 2/1958 | Cole | 15/413 |
| 2,985,779 | 5/1961 | Flaningam et al. | 310/156 |
| 3,263,908 | 8/1966 | Kroker et al. | 310/63 |
| 3,610,975 | 10/1971 | Onjanow | 310/63 |
| 4,093,897 | 6/1978 | Fujita et al. | 310/268 |
| 4,096,419 | 6/1978 | Wren et al. | 318/138 |
| 4,120,616 | 10/1978 | Dwyer et al. | 310/63 |
| 4,374,347 | 2/1983 | Muller | 318/138 |
| 4,435,673 | 3/1984 | Hagino et al. | 318/254 |
| 4,494,056 | 1/1985 | Nishijima et al. | 318/269 |
| 4,528,485 | 7/1985 | Boyd, Jr. | 310/259 |
| 4,543,506 | 9/1985 | Kawada | 310/156 |
| 4,642,502 | 2/1987 | Carpenter et al. | 310/156 |
| 4,668,898 | 5/1987 | Harms et al. | 310/67 R |
| 4,680,515 | 7/1987 | Crook | 318/138 |
| 4,697,114 | 9/1987 | Amemiya et al. | 310/156 |
| 4,698,534 | 10/1987 | Smith et al. | 310/89 |
| 4,698,538 | 10/1987 | Yoshida | 310/156 |
| 4,773,829 | 9/1988 | Vettori | 310/68 R |
| 4,883,982 | 11/1989 | Forbes et al. | 310/62 |
| 4,973,872 | 11/1990 | Dohogne | 310/156 |
| 5,041,749 | 8/1991 | Gaser et al. | 310/156 |

FOREIGN PATENT DOCUMENTS

| | | | |
|---|---|---|---|
| 0137558 | 8/1947 | Australia | 15/413 |
| 2003905 | 8/1971 | Germany | 15/413 |
| 2945865 | 6/1981 | Germany | 15/413 |
| 0309294 | 4/1929 | United Kingdom | 310/156 |

*Primary Examiner*—R. Skudy
*Assistant Examiner*—Clayton E. LaBalle
*Attorney, Agent, or Firm*—Robbins, Berliner & Carson

[57] ABSTRACT

An electronically commutated motor for dust exhausters with a stator with excitation windings and with a rotor positioned to rotate in an air gap. The rotor has bundled laminations and permanent magnets around its circumference corresponding to the number of poles of the stator. A fan rotor of a ventilator is also provided on the rotor shaft, with the fan rotor connected downstream from the motor in the intake direction of the cooling air. The rotor shaft is connected with a turbine for generation of an intake air current, wherein the fan rotor is positioned in the upper bearing plate of the turbine. The bearing plate is designed in one piece in immediate vicinity of the turbine rotor and has indentations and cutouts in a radially outward direction, whereby air currents of the fan rotor and the turbine rotor flow each from its respective side, with the exit slots for cooling air from the fan rotor and the outlets for the exhaust from the turbine going out from the bearing plate.

12 Claims, 7 Drawing Sheets

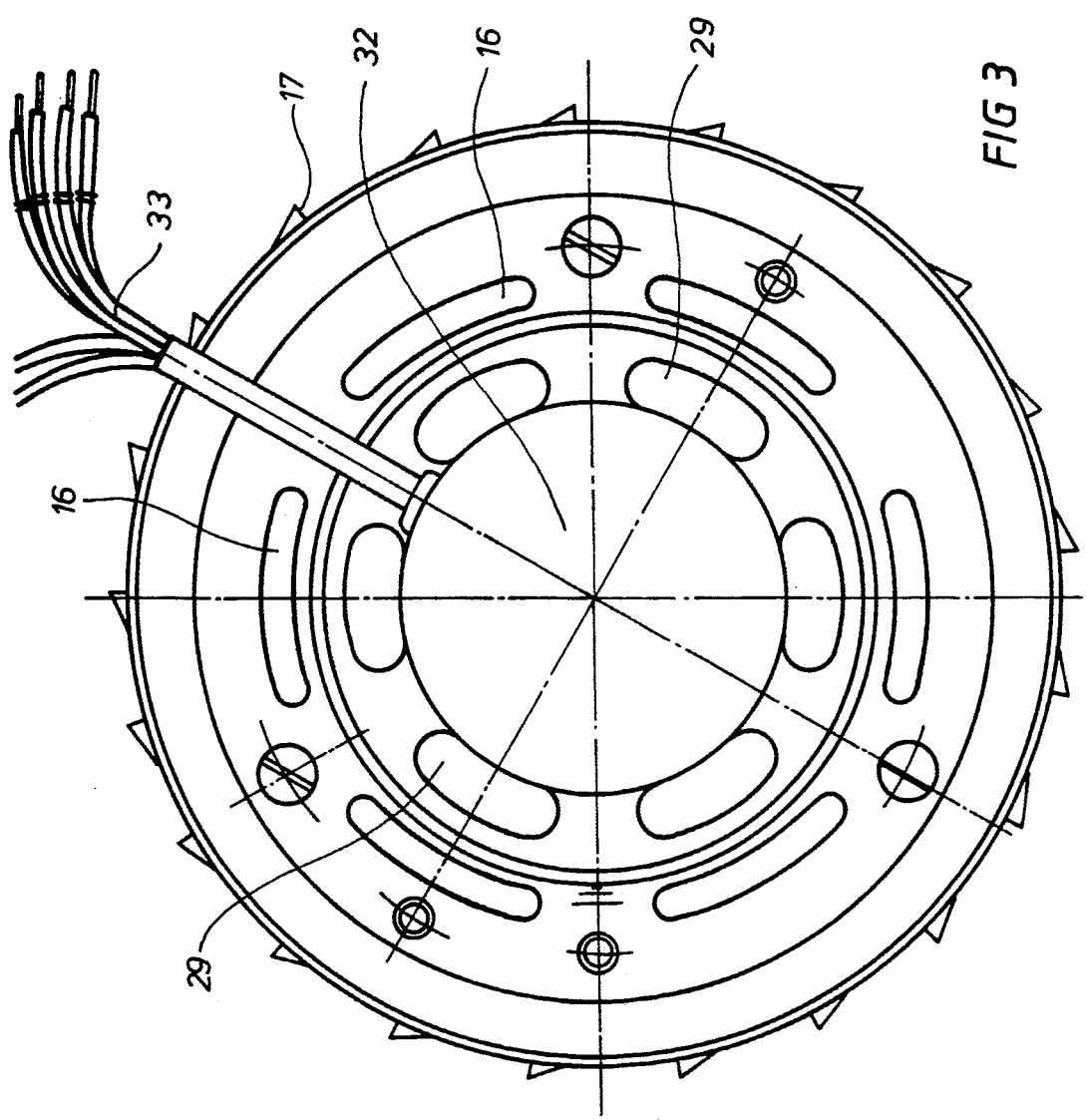

ELECTRONICALLY COMMUTATED MOTOR FOR DUST EXHAUSTERS, VACUUM CLEANERS AND SIMILAR DEVICES

This is a continuation of application Ser. No. 07/917,732, filed on Jul. 20, 1992, now abandoned, which is a continuation of application Ser. No. 07/551,985, filed on Jul. 12, 1990, now abandoned.

BACKGROUND OF THE INVENTION

The invention concerns an electronically commutated motor for dust exhausters, vacuum cleaners or similar devices having a stator with excitation windings and a rotor positioned to rotate in an air gap. The rotor has bundled laminations and permanent magnets around its circumference matching the number of poles of the stator. Furthermore, a fan rotor is also provided on the rotor shaft as a ventilator and the rotor shaft is connected to a turbine to generate an intake air current.

In electrical motors, and especially in dust exhausters and contaminant removal systems or similar devices, commutated or brushless motors which operate with high performance are already known, but have the disadvantage, particularly in the high-speed ranges, of not having the necessary operational safety. The prior art motors definitely do have high starting torque; however, they disadvantageously have a relatively unfavorable performance volume ratio and require a lot of space, particularly in devices designed for manual use.

The designs of prior art motors also have the disadvantage that the motor or bearings will run hot, particularly when a turbine must also be driven, as a result of high motor performance and the resultant heat which is released. In particular, prior art motors have an inadequate introduction of cooling air for the motor and for the bearings of an associated turbine.

The objective of the present invention is therefore to design an electronically commutated motor in such way that achieves an increased speed, with a particularly safe design of the motor and the turbine, regardless of the starting torque at high performance levels, and with no danger of the motor, the motor bearings, or the turbine bearings running hot.

SUMMARY OF THE INVENTION

To satisfy the objective, according to the invention the fan rotor is installed on the rotor shaft downstream from the motor in the intake direction of the cooling air. The fan rotor is also thus positioned in the immediate vicinity of the turbine rotor inside the upper bearing plate of the turbine.

One major aspect of the invention resides in the fact that the fan rotor of the motor, which is located in the ventilator fan, is positioned in the immediate vicinity of the highly stressed turbine bearings. In this manner, that the cooling air for the motor also reaches the turbine bearings at the same time so that, along with high operational safety, hot operation of the motor or the bearings of the motor and the turbine is prevented.

By placing the fan rotor on the motor in the intake direction of the cooling air, the cooling air first passes through the motor itself and then, after passing through the motor, also cools the upper motor bearings and the immediately adjacent turbine rotor bearings, thus achieving high operational safety.

In an advantageous configuration, the upper bearing plate of the turbine is formed in one piece as an internal wall between the fan rotor and the turbine rotor and has indentations and cutouts outward from the bearings of the rotor shaft in the direction toward the fan rotor such that both the exit slots for the fan cooling air and the outlets for the turbine exhaust go out from the bearing plate of the turbine. Thus, at the same time, cooling air exit slots and turbine exhaust outlets go out from a single bearing plate in connection with indentations and cutouts so that the bearing plate itself, and also especially the bearings in the plate, specifically the upper motor bearings and the turbine rotor bearings, are advantageously cooled.

The cooling air exit slots and the turbine exhaust outlets are thus positioned close to each other in connection with the one-piece bearing plate so that uniform outflow occurs in a small region of the motor-turbine configuration. That is, the outflow of the cooling air through the exit slots and the outflow of the turbine exhaust through the outlets combine, whereby interactive exhaust effects of the air currents are created since the turbine exhaust also draws off the fan exhaust and vice versa. This allows high cooling performance of the motor and bearings as well as high operational safety.

In a further advantageous configuration, to increase operational safety at high speeds, permanent magnets are arranged around the circumference of the rotor sequentially in the form of an annular shell. The long sides of the permanent magnets have a conical bevel designed with the conical bevel expanding in the direction of the rotor shaft. Thus the permanent magnets are surrounded on their long sides in a ring by end covers of the rotor having corresponding conical bevels in the opposite direction.

By means of the conical bevels of the covers, which mesh with the corresponding bevels of the permanent magnets on their long sides, there occurs at high speeds a particularly strong—increasingly strong with increased centrifugal force—union of the rotor parts. This achieves a great operational saftey through the high mechanical stability of the rotor.

In connection with the design of the rotor shown, the air gap between the permanent magnets and the stator is advantageously designed narrowing in a variable arrangement corresponding to the number of poles of the stator, where from one excitation winding or one stator winding to the next winding a continuous narrowing is provided in order to always achieve the same operation of the motor toward the direction of the narrowing. Thus, in the invention, the air gap between the rotor and the stator is not designed to be constant but rather designed in a variable arrangement at times narrow and at times wide so that, as desired, the same motor operating direction is always obtained. This special air gap configuration also provides the advantage that the lamination assemblies of the rotor or the stator do not have to be operated in the saturated region but rather run in an unsaturated region, an advantage from the standpoint of hysteresis.

Advantageously, one or several permanent magnets are positioned around the circumference whereby control pulses are supplied via a Hall sensor to a frequency control as a function of the rotation of the rotor shaft.

Furthermore, electronic commutation of the motor is advantageously provided in connection with a frequency convertor where a control frequency corresponding to the desired speed and also control pulses from a Hall sensor are applied to inputs of the frequency convertor and the stator windings of the motor are controlled in sequence by the output of the frequency convertor via push-pull output stages.

Thus, the advantage is obtained that the motor can be operated—depending on the control frequency—at as high a speed as desired and in fact at very high speeds, with particularly high operational safety achieved in conjunction with the special cooling of the motor bearings or the configuration of the bearings on the upper bearing plate and the configuration of the rotor with the conical mounting of the permanent magnets.

The use of the motor design set forth according to the invention is particularly advantageous for application in dust exhausters. A motor such as that described according to the present invention will cause no sparking of brushes; it thus fully complies with the technical safety specifications established for Type 1 industrial dust exhausters protected against dust explosions (type free of ignition sources). Such an exhauster must be used in zone 11 according to the explosion protection guidelines.

These technical safety specifications were drawn up by the *Berufsgenossenshaftliches Institut fur Arbeitssicherheit* (Institute for Occupational Safety) in St. Augustin and are detailed in the *GS-Zeichen-Prufung* (GS-Mark-Test); therefore, they are decisive for obtaining the *GS-Zeichen* (GS-Mark) certification of safety.

Additional advantageous configurations of the invention emerge from the secondary claims. The subject matter of the present invention results not merely from the subject matter of the individual patent claims but also results from the combination of the individual patent claims. All information and characteristics presented in the documentation—including the abstract—and especially the physical configuration presented in the drawings are claimed as being basic to the patent to the extent that they are novel individually or in combination with regard to the prior art.

In the following, the invention is illustrated in greater detail using drawings representing only one embodiment. In this process, additional basic characteristics and advantages of the invention emerge from the drawings and the explanations.

BRIEF DESCRIPTION OF THE DRAWINGS

The drawings show:

FIG. 3 an end view of the motor-turbine configuration according to the invention showing the cooling air intake and exit slots;

DETAILED DESCRIPTION OF THE INVENTION

Figure 1:
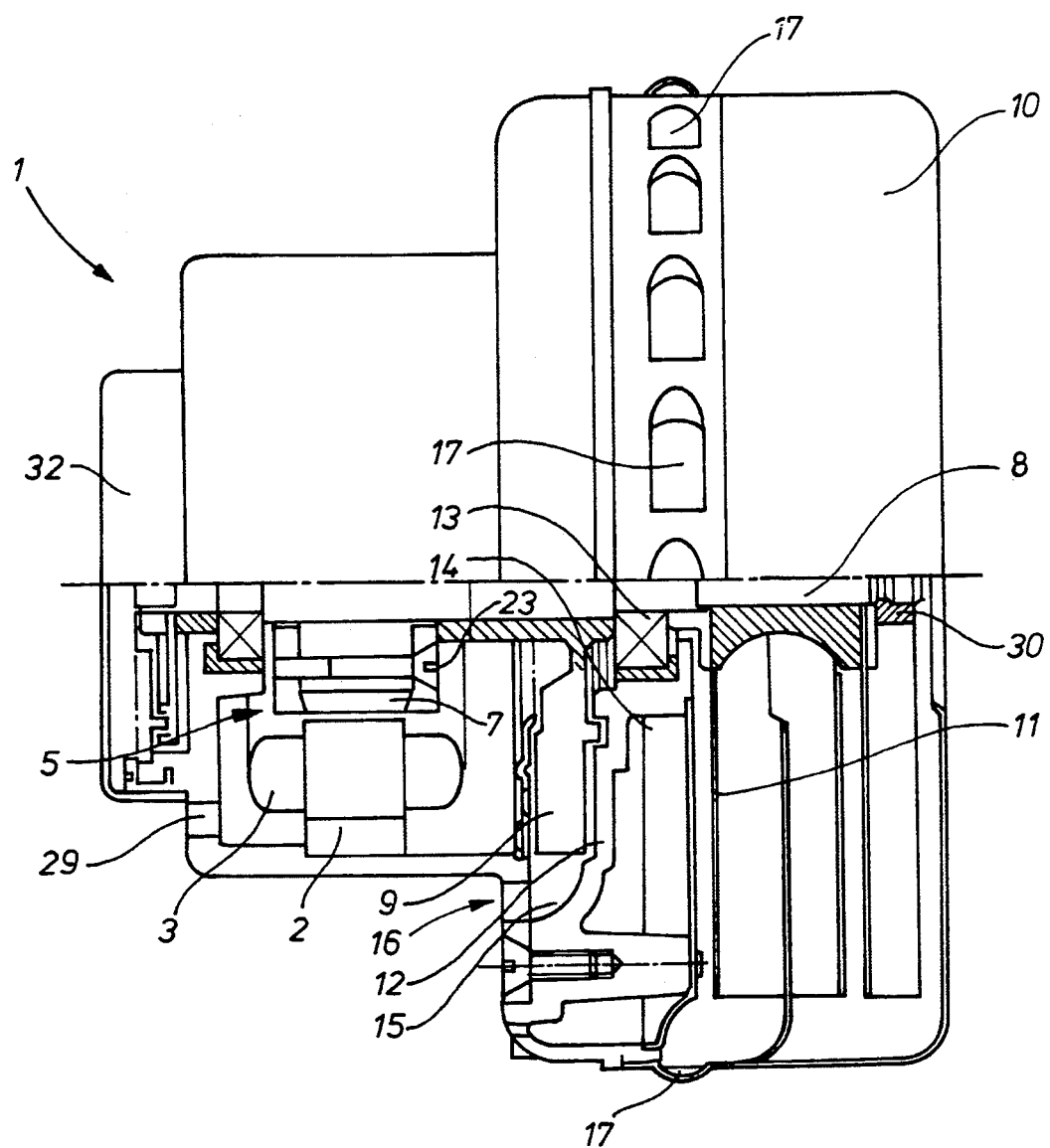
FIG. 1 a representation of the commutated motor with turbine according to the invention, partially cut-away.

In FIG. 1, a motor 1 with an associated turbine 10 is seen, with the motor 1 consisting of a stator 2 with excitation windings or stator windings 3 and a rotor 5.

One end of the end motor is covered by a cover 32 and has intake slots 29 for cooling air, with a fan rotor 9 sucking in the cooling air via the intake slots 29 and exhausting it via exit slots 16.

Figure 2:
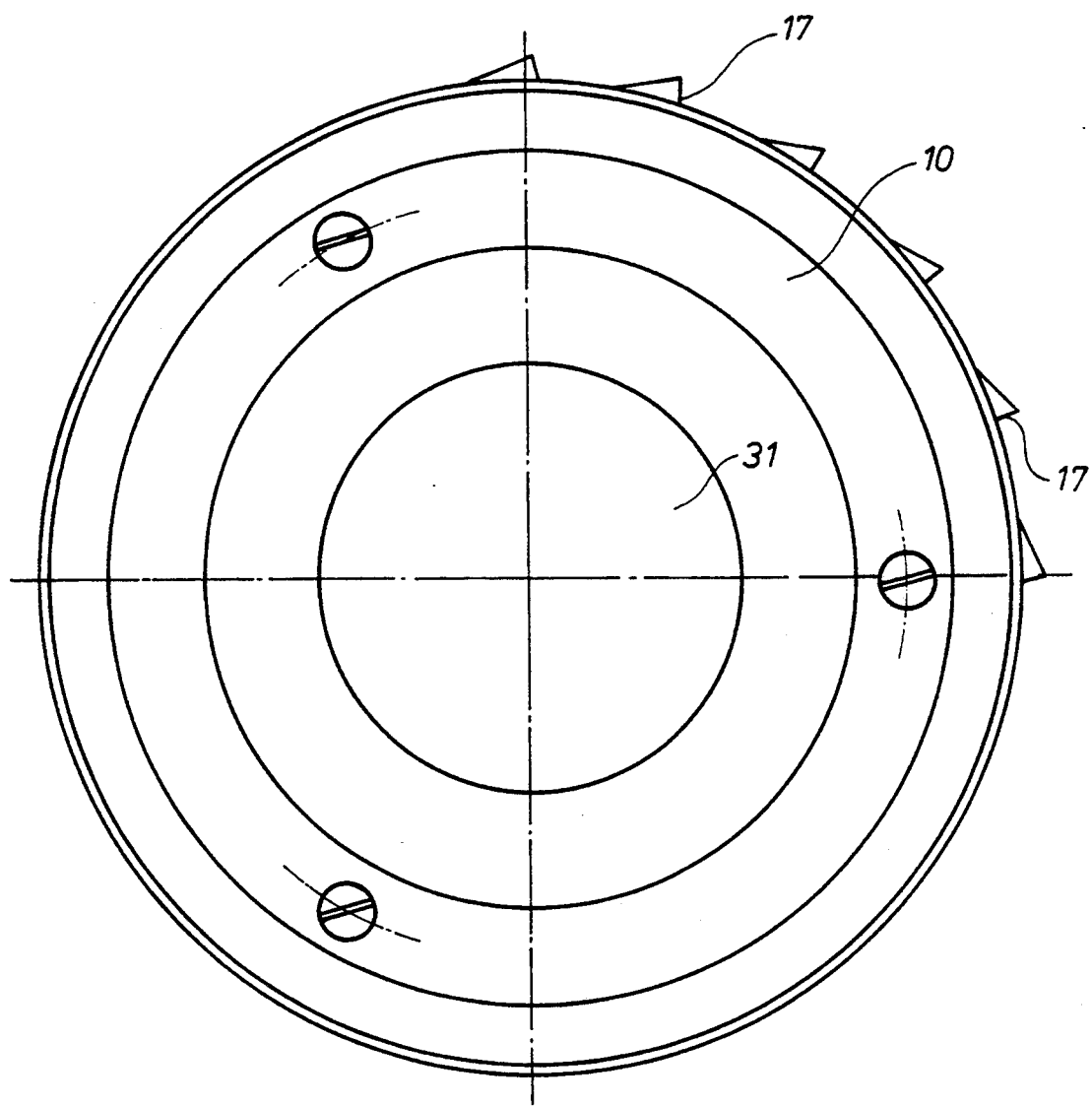
FIG. 2 a view of the turbine with intakes and outlets.

On a rotor shaft 8, both the fan rotor 9 and a turbine rotor 11 are positioned in the region of the upper motor bearing on a continuously designed upper bearing plate 12, which forms a bearing 13 for the turbine rotor 11 in the immediate vicinity of the bearing for the fan rotor 9. On the circumference of the turbine 10, outlets 17 are provided where, as shown in FIG. 2, the stream of intake air enters the turbine through an inlet 31. In the lower region, the turbine is supported on a lower bearing 30, which, due to its distance from the motor, is only slightly affected by the development of heat.

The fan rotor 9 conveys the cooling air as a ventilator via exit slots 16 into the open air and at the same time also cools the upper bearing plate 12 for the bearing 13 of the upper turbine bearing so that excessive development of heat is prevented in this bearing region.

In the region of the turbine rotor 11, the upper bearing plate 12 has in its cross-section indentations 14 running at an angle to each other so that in this region the turbine exhaust advantageously cools the bearing plate 12, with the bearing plate also being cooled by means of the fan rotor 9, particularly in connection with a curved formation 15 in the bearing plate along which the cooling air flows out. The fan rotor 9 is positioned in the immediate vicinity of the turbine rotor 11 relative to the bearing and, in fact, in the region of a shared upper bearing plate 12, whereby here, in connection with adjacent outlets for the motor cooling air and the turbine exhaust, a particularly advantageous cooling of the motor and the bearings is obtained.

FIG. 3 shows in detail an end view of the intake slots 29 of the fan rotor 9 for the motor cooling air as well as the exit slots 16 for the fan rotor 9 on the end. In connection with the adjacent arrangement of the outlets 17 for the exhaust of the turbine 10 mutually enhanced discharge of the cooling air and exhaust is obtained, with the exiting currents of air flowing out together, which provides the benefit of increased cooling of the motor and the bearings.

Figure 9:
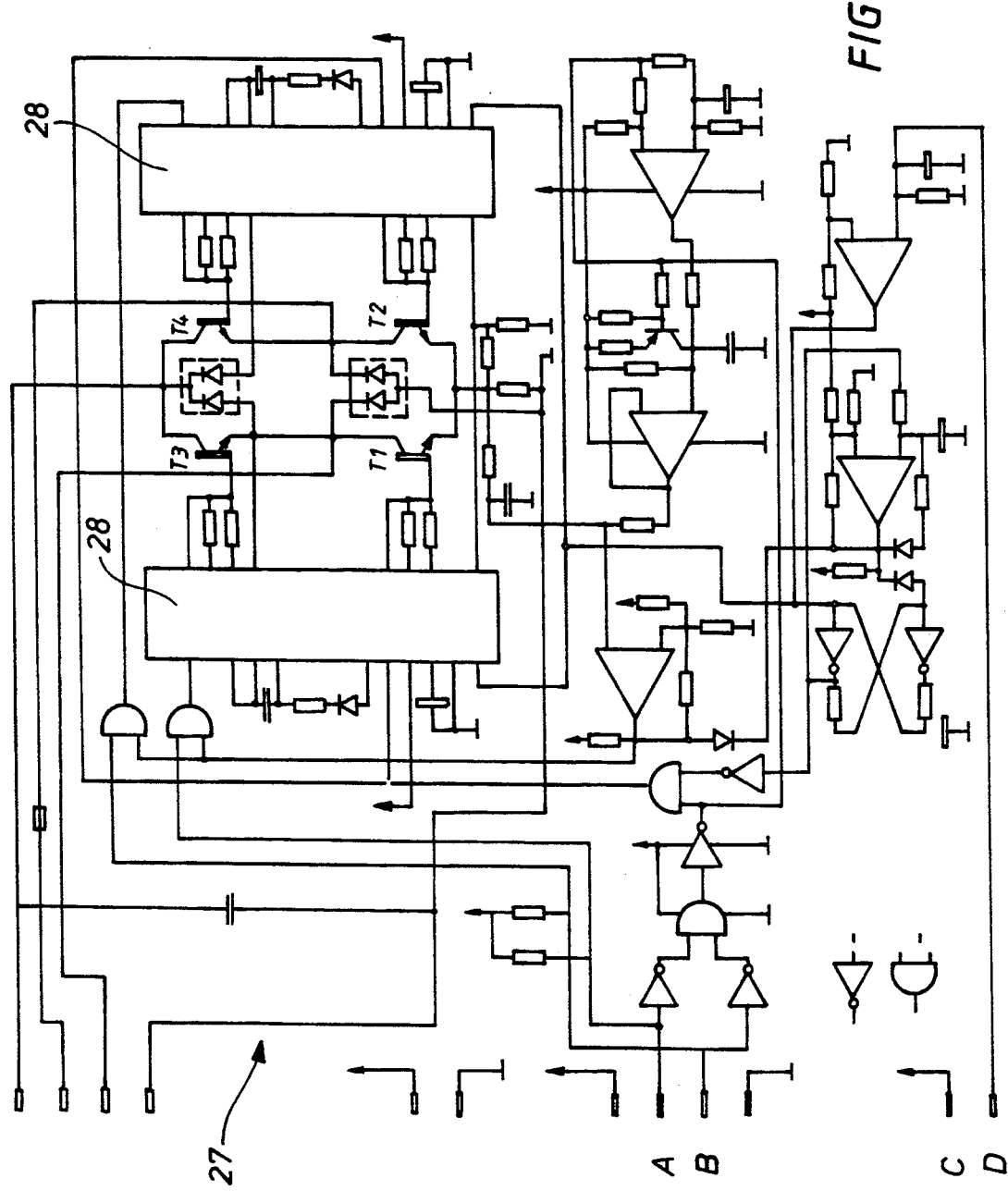
FIG. 9 the wiring diagram of a frequency convertor for operation of the commutated motor according to the invention.

FIG. 3 again shows the end cover 32 out of and into which connections 33 run to connect the frequency convertor at this location according to FIG. 9.

Figure 4:
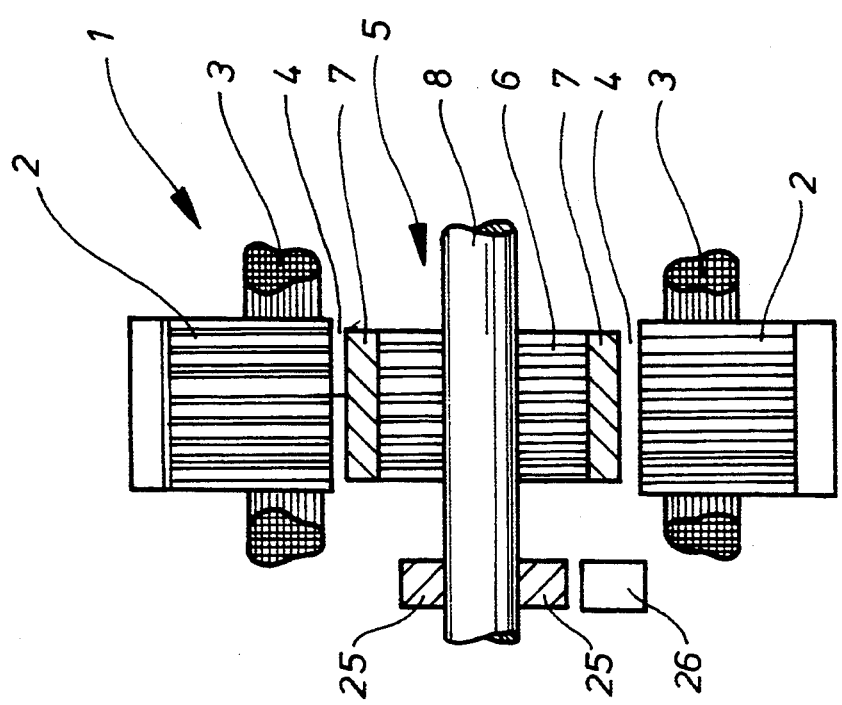
FIG. 4 a schematic representation of the stator and rotor of the motor in a longitudinal section showing the speed control via a Hall sensor.

FIG. 4 shows a detailed longitudinal section of the motor 1, consisting of the stator 2 and the rotor 5, showing the excitation windings 3 and the bundled groups of stator and rotor laminations 6. The rotor 5 moves in the region of an air gap 4, where permanent magnets 7 are positioned above the stator 2 as an annular ring around the rotor.

In the region of the rotor shaft, one or several permanent magnets 25 are arranged around it, opposite which a Hall sensor 26 is positioned. Through rotation of the rotor 5 pulses are generated in the Hall sensor 26 which then control the frequency convertor at inputs C and D according to FIG. 9.

Figure 5:
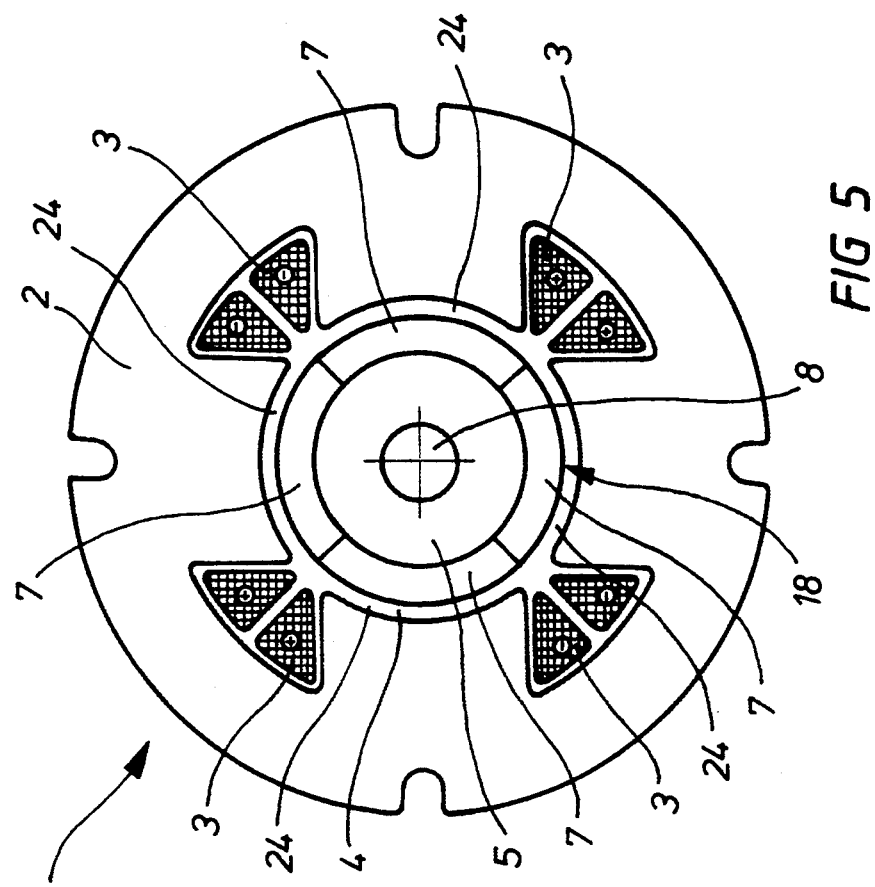
FIG. 5 the stator and rotor according to FIG. 4 in cross-section showing the narrowed air-gap configuration.

The cross-section of the motor configuration according to FIG. 5 specifically shows the configuration of the air gap 4 using the same reference numbers as in FIG. 4, where the air gap 4 has a constant narrowing 24 from one stator winding 3 to the next, by means of which the same starting direction of the motor is always obtained.

In the exemplary embodiment according to FIG. 5, the permanent magnets 7 are designed as annular shells 18 and surround the rotor 5 in a string like a shell. The number of permanent magnets 7 is determined by the desired number of poles in connection with the excitation windings 3 distributed around the stator 2. In the exemplary embodiment according to FIG. 5, four permanent magnets are provided to correspond with four excitation windings arranged in triangles within notches in the stator 2.

Figure 6:
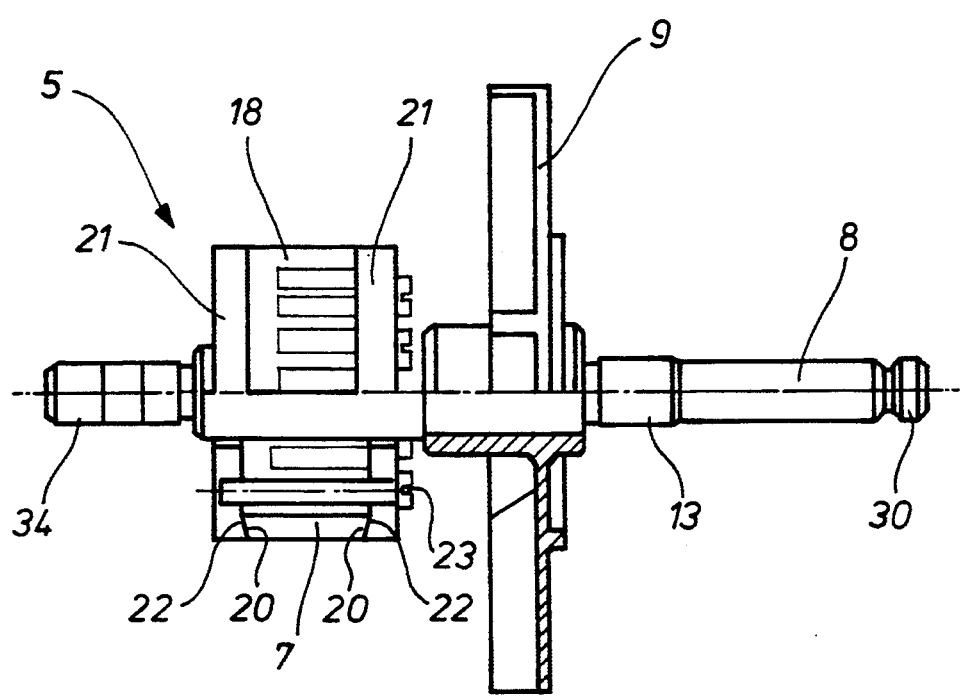
FIG. 6 the rotor with the fan rotor on the rotor shaft showing the bearing region with its individual parts.

FIG. 6 shows a detailed drawing of the rotor shaft 8 with the rotor 5 and the fan rotor 9. Here, with the help of FIG. 7, the configuration of the permanent magnets 7 as annular shells 18 becomes particularly clear. The annular shells 18 have on their long sides conical bevels 20 which expand in the direction of the rotor shaft. Covers 21 arranged on the end of the rotor 5, also have corresponding conical bevels 22 with opposing slopes and surround the permanent magnets 7 on the periphery of the rotor 5, in such a way that even with high speeds a secure union of the rotor is obtained.

Figure 7:
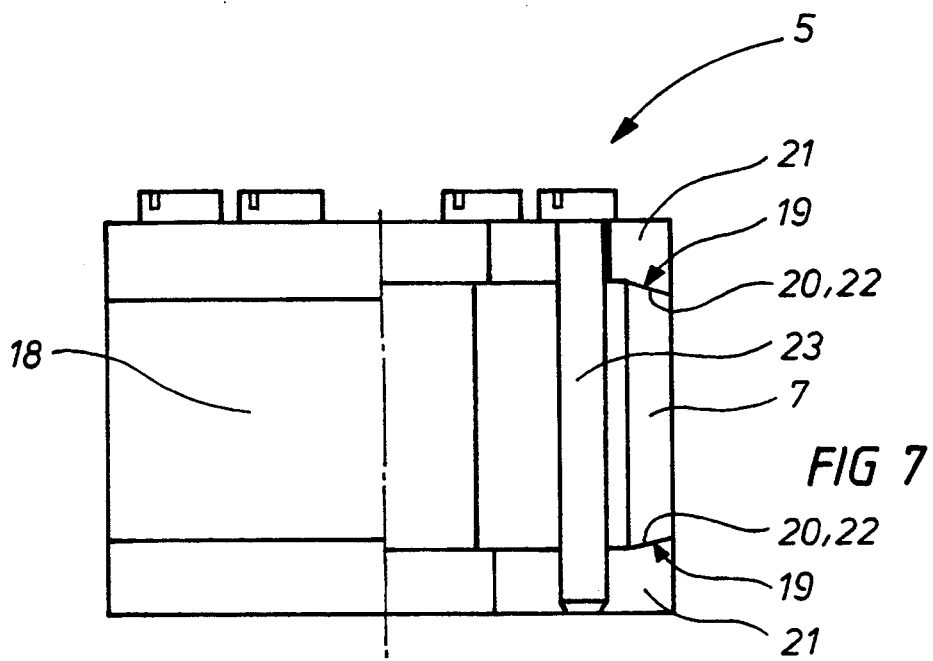
FIG. 7 the rotor showing the conical mounting of the permanent magnets in detail.
Figure 8:
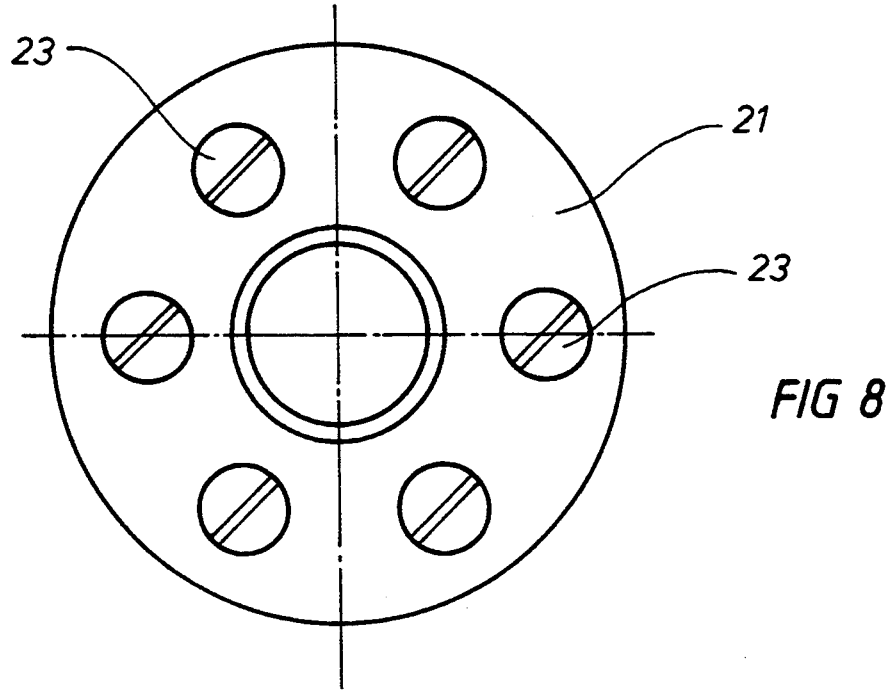
FIG. 8 an end view of the rotor according to FIG. 7.

According to FIG. 7, the covers 21 in the periphery are penetrated by attachment screws 23, also visible in FIG. 8, whereby the covers 21 enter into a secure union with the permanent magnets 7 in the region of the conical bevels 22, particularly in the peripheral regions where the annular shells 18 have conical bevels 0 with opposing slopes.

From FIG. 6, it is also clear that an upper bearing 13 is provided for the turbine on the rotor shaft 8 in direct connection with the fan rotor 9, with, according to FIG. 1, the upper bearing plate 12 beginning at this bearing 13. Here in connection with the ventilation of the bearing plate 12 both by means of the fan rotor 9 and the turbine rotor 11, a particularly advantageous cooling of the motor, specifically of the excitation winding 3 and the bearing arrangement, particularly of the upper bearing 13, is obtained. The rotor shaft 8 is then introduced into the bearing 34 which is protected by a cover 32 according to FIG. 1. Furthermore, the bearing 13 is positioned in the region of the upper bearing plate 12, with this bearing absorbing both the radial forces of the fan rotor 9 and similar forces from the turbine rotor 11. Furthermore, the turbine rotor 11 is held on the rotor shaft 8 in the region of the lower bearing 30 in connection with a ring bearing not shown in detail here.

In the enlarged detail drawing of FIG. 7, long sides 19 of the permanent magnets 7, which are held in the region of their conical bevels 20 by similar bevels 22 radiating in the opposing direction from the covers 21, can be seen especially clearly.

A frequency convertor 27 is shown as an exemplary embodiment in FIG. 9 with a push-pull circuit AB where the control frequency of power controllers 28, which are arranged as push-pull circuits, is fed via inverters in connection with gating through AND-gates.

Furthermore, a control pulse generated by the Hall sensor 26 is fed in via the inputs C, D and then amplified by amplification elements and is fed following a query for the control frequency as a control input regulator of the output stages 28. The output stages 28 are supplied by a power supply which is not shown in detail and control the motor with their output via power controllers T1, T2 or T3 and T4. Furthermore, logic elements are provided for frequency compensation and suppression of interference or starting procedures. By raising or lowering the control frequency at the input of the frequency convertor, it is possible to operate the motor at any speed, even at very high speeds, with subsequent control of the desired speed carried out via the Hall sensors 26 through control of the output stages 28.

What is claimed is:

1. An electronically commutated motor, comprising:
   a housing;
   a shaft;
   a main bearing supporting said shaft;
   a bearing plate for removing heat from said main bearing and for dividing said housing into a rotor chamber and a turbine chamber;
   rotor means mounted on said shaft in said rotor chamber;
   stator means mounted in said rotor chamber surrounding said rotor means for causing rotation of said shaft and rotor means;
   fan rotor means mounted on said shaft in said rotor chamber for drawing gas through a rotor chamber intake aperture past said bearing plate for heat transfer therefrom and for exhausting said gas through one or more rotor chamber exhaust apertures;
   turbine means mounted on said shaft in said turbine chamber for drawing gas through a turbine chamber intake aperture past said bearing plate for heat transfer therefrom and for exhausting said gas through one or more turbine chamber exhaust apertures;
   wherein said bearing plate is formed in one piece, separating said fan means from said turbine means, and has indentations and cutouts in a radially outward direction, into which gases from said fan means and said turbine means engage from their respective sides, thus cooling said bearing plate from both sides; and
   wherein both said rotor chamber and turbine chamber exhaust apertures are positioned close to one another in connection with said bearing plate, thus allowing said bearing plate to be advantageously cooled.

2. The invention of claim 1 wherein said turbine chamber intake aperture is located separately from said rotor chamber intake aperture so that gas containing contaminants may be drawn through said turbine chamber while gas containing fewer contaminants may be drawn through said rotor chamber.

3. The invention of claim 1 wherein said turbine chamber exhaust apertures are aligned with said rotor chamber exhaust apertures so that gas exhausted from one said chamber aids in the exhausting of gas from the other of said chambers.

4. The invention of claim 1 wherein said rotor chamber intake aperture is located on a first side of said rotor means and said fan means is mounted on said shaft on a second side of said rotor means between said rotor means and said bearing plate so that heat transfer from said bearing plate to said gas in said rotor chamber occurs after said gas is moved past said rotor and stator means.

5. The invention of claim 1 wherein said turbine intake aperture is located along the axis of the shaft, said turbine exhaust apertures are located at a periphery of said turbine chamber at a distance from the axis of said shaft and said turbine means further comprises:

means for drawing gas in said turbine chamber so that said gas radiates outwardly from the axis of the shaft to the exhaust apertures.

6. The invention of claim 1 wherein said rotor means further comprises:
bundled groups of rotor laminations;
permanent magnets positioned around said bundled rotor laminations in an annular shell having a conical bevel; and
end cap means having a matching bevel for retaining said magnets and laminations on said shaft.

7. The invention of claim 1 wherein said stator means include excitation windings and rotor and stator means are separated by an air gap with an increased narrowing from one excitation winding to the next adjacent excitation winding so that the shaft always starts to rotate in the direction of the narrowing.

8. The invention of claim 1 further comprising:
one or more permanent magnets arranged around a circumference of said rotor means sequentially in the form of an annular shell with the long sides of said permanent magnets having a conical bevel and designed with a conical bevel expanding in the direction of said shaft, whereby the permanent magnets are surrounded on their long sides in a ring by end covers of said rotor means which have corresponding conical bevels in the opposite direction.

9. The invention of claim 8 wherein said end covers in the periphery are penetrated by attachment screws and whereby said covers enter into a secure union with said permanent magnets in the region of said conical bevels.

10. The invention of claim 9 wherein said stator means include excitation windings and rotor and stator means are separated by an air gap with an increased narrowing from one excitation winding to the next adjacent excitation winding so that the shaft always starts to rotate in the direction of the narrowing.

11. The invention of claim 10 wherein one or more permanent magnets are positioned around the circumference of said shaft and wherein control pulses are supplied via a Hall sensor to a frequency control as a function of the rotation of said shaft.

12. The invention of claim 11 further comprising:
means for electronically commutating said stator means to cause rotation of said shaft;
frequency means for driving said motor;
Hall sensors for monitoring speed of said motor and generating control pulses responsive to speed of said motor;
amplification means for generating amplified control pulses in response to said control pulses;
logic elements for altering behavior of said frequency means when said motor is stopped.

* * * * *